US010668569B2

(12) United States Patent
Odanaka et al.

(10) Patent No.: US 10,668,569 B2
(45) Date of Patent: Jun. 2, 2020

(54) LASER PROCESSING APPARATUS

(71) Applicant: DISCO CORPORATION, Tokyo (JP)

(72) Inventors: Kentaro Odanaka, Tokyo (JP);
Hironari Ohkubo, Tokyo (JP);
Zentaro Kawasaki, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 254 days.

(21) Appl. No.: 15/148,495

(22) Filed: May 6, 2016

(65) Prior Publication Data

US 2016/0332260 A1 Nov. 17, 2016

(30) Foreign Application Priority Data

May 15, 2015 (JP) .................. 2015-099843

(51) Int. Cl.
*B23K 26/364* (2014.01)
*B23K 26/03* (2006.01)
*B23K 26/06* (2014.01)
*B23K 26/08* (2014.01)
*B23K 101/40* (2006.01)

(52) U.S. Cl.
CPC .......... *B23K 26/364* (2015.10); *B23K 26/032* (2013.01); *B23K 26/0665* (2013.01); *B23K 26/0853* (2013.01); *B23K 2101/40* (2018.08)

(58) Field of Classification Search
CPC ............. B23K 2201/40; B23K 26/032; B23K 26/0665; B23K 26/0853; B23K 26/364; G06T 2207/30148; G01N 2223/6116
USPC ........... 219/121.67, 121.68, 121.69, 121.83; 382/145, 149, 151
See application file for complete search history.

(56) References Cited

U.S. PATENT DOCUMENTS

| 6,527,965 B1* | 3/2003 | Gee ........................ B23K 26/40 216/24 |
| 6,706,999 B1* | 3/2004 | Barrett .................... B23K 26/02 219/121.74 |
| 7,544,588 B2* | 6/2009 | Genda ................ B23K 26/0736 257/E21.599 |
| RE43,400 E * | 5/2012 | O'Brien ............... B23K 26/032 219/121.62 |
| 8,781,070 B2* | 7/2014 | Wormington .......... G01N 23/20 378/81 |

(Continued)

FOREIGN PATENT DOCUMENTS

| JP | 54111757 A | 9/1979 |
| JP | 2006-245467 | 9/2006 |

(Continued)

*Primary Examiner* — Ibrahime A Abraham
*Assistant Examiner* — Frederick F Calvetti
(74) *Attorney, Agent, or Firm* — Greer Burns & Crain, Ltd.

(57) ABSTRACT

Disclosed herein is a laser processing apparatus including a controller. The controller includes a target pattern detecting section performing matching between patterns formed in each device imaged and a key pattern to thereby detect a target pattern included in each device, a spacing detecting section detecting the spacing in a Y direction between the target pattern and an ablation groove formed along each division line by ablation, and a map creating section creating a map showing the spacing in the Y direction between each target pattern and the ablation groove for the plural devices arranged along the ablation groove.

8 Claims, 5 Drawing Sheets

(56) References Cited

U.S. PATENT DOCUMENTS

| | | | |
|---|---|---|---|
| 8,946,056 B2* | 2/2015 | Ueno | B23K 26/38 |
| | | | 438/463 |
| 9,110,033 B2* | 8/2015 | Bills | G01N 21/21 |
| 9,488,591 B2* | 11/2016 | Bills | G01N 21/21 |
| 2002/0149136 A1* | 10/2002 | Baird | B23K 26/083 |
| | | | 264/400 |
| 2002/0190435 A1* | 12/2002 | O'Brien | B23K 26/032 |
| | | | 264/400 |
| 2006/0091126 A1* | 5/2006 | Baird | B23K 26/0604 |
| | | | 219/121.72 |
| 2007/0127807 A1* | 6/2007 | Koshikawa | G06K 9/00 |
| | | | 382/149 |
| 2007/0141810 A1* | 6/2007 | Nakamura | B23K 26/0057 |
| | | | 438/460 |
| 2009/0321397 A1* | 12/2009 | Krishnaswami | B23K 26/0838 |
| | | | 219/121.68 |
| 2010/0110419 A1* | 5/2010 | Bills | G01N 21/21 |
| | | | 356/237.2 |
| 2010/0197116 A1* | 8/2010 | Shah | B23K 26/38 |
| | | | 438/463 |
| 2010/0301023 A1* | 12/2010 | Unrath | B23K 26/0648 |
| | | | 219/121.67 |
| 2011/0195535 A1* | 8/2011 | Koyanagi | B23K 26/032 |
| | | | 438/33 |
| 2012/0087569 A1* | 4/2012 | O'Dell | G01N 21/9501 |
| | | | 382/149 |
| 2012/0289028 A1* | 11/2012 | Abatake | B23K 26/032 |
| | | | 438/463 |
| 2012/0309169 A1* | 12/2012 | Endo | H01L 21/78 |
| | | | 438/462 |
| 2013/0217153 A1* | 8/2013 | Knippels | B23K 26/083 |
| | | | 438/7 |
| 2013/0335733 A1* | 12/2013 | Bills | G01N 21/21 |
| | | | 356/237.2 |
| 2014/0305917 A1* | 10/2014 | Gadd | B23K 26/36 |
| | | | 219/121.72 |
| 2015/0042987 A1* | 2/2015 | Bills | G01N 21/21 |
| | | | 356/237.2 |
| 2015/0042993 A1* | 2/2015 | Bills | G01N 21/21 |
| | | | 356/369 |
| 2015/0285746 A1* | 10/2015 | Suematsu | G01N 23/2251 |
| | | | 348/86 |
| 2016/0207145 A1* | 7/2016 | Sampei | B23K 26/402 |
| 2016/0288251 A1* | 10/2016 | Hirata | B23K 26/0006 |
| 2017/0010222 A1* | 1/2017 | Bills | G01N 21/21 |

FOREIGN PATENT DOCUMENTS

| | | | |
|---|---|---|---|
| JP | 2007-019252 | | 1/2007 |
| JP | 2007-173475 | | 7/2007 |
| JP | 2011151117 A | | 8/2011 |
| JP | 2012151225 | * | 8/2012 |
| JP | 2013038364 A | | 2/2013 |

* cited by examiner

| Device | Target pattern | Spacing (μm) in Y direction between target pattern and ablation groove M |
|---|---|---|
| D1 | P1 | 203 |
| D2 | P2 | 241 |
| D3 | P3 | 220 |
| D4 | P4 | 232 |
| D(m-3) | P(m-3) | 220 |
| D(m-2) | P(m-2) | 226 |
| D(m-1) | P(m-1) | 210 |
| Dm | Pm | 215 |

LASER PROCESSING APPARATUS

BACKGROUND OF THE INVENTION

Field of the Invention

The present invention relates to a laser processing apparatus for applying a laser beam to a wafer to thereby form an ablation groove on the wafer.

Description of the Related Art

A plurality of devices such as ICs and LSIs are formed on the front side of a wafer so as to be separated by a plurality of division lines. The wafer is divided into the individual devices by using a laser processing apparatus to apply a laser beam along the division lines and thereby form an ablation groove on the front side of the wafer along each division line. The individual devices thus obtained are used in various electronic equipment.

The laser processing apparatus mentioned above includes a chuck table for holding the wafer, laser beam applying means having focusing means for applying the laser beam to the wafer held on the chuck table, feeding means for relatively feeding the chuck table and the laser beam applying means in an X direction, indexing means for relatively indexing the chuck table and the laser beam applying means in a Y direction perpendicular to the X direction, an imaging unit for imaging a work area, and a controller. With this configuration, an ablation groove can be formed with high accuracy on the wafer by applying the laser beam along each division line having a width of about 50 μm, for example (see Japanese Patent Laid-open No. 2006-245467, for example).

Such an ablation groove along each division line is formed in the case of dividing the wafer into the individual devices from this groove as a division start point (see Japanese Patent Laid-open No. 2007-19252, for example) or in the case of removing low-permittivity insulator films (low-k films) stacked on each division line (see Japanese Patent Laid-open No. 2007-173475, for example). In any case, the devices are formed adjacent to the division lines. Accordingly, the ablation groove must be formed inside each division line so as not deviate from the width thereof.

SUMMARY OF THE INVENTION

However, in the case that yawing (rotational vibration) in the Y direction occurs in the feeding means for relatively feeding the chuck table and the laser beam applying means in the X direction, there is a problem such that the laser beam may deviate from each division line to cause damage to the devices.

It is therefore an object of the present invention to provide a laser processing apparatus which can detect whether or not the yawing of the feeding means in the Y direction falls within tolerance in the case of applying a laser beam to a wafer to form an ablation groove on the wafer along each division line.

In accordance with an aspect of the present invention, there is provided a laser processing apparatus for applying a laser beam to a wafer along a plurality of crossing division lines to form an ablation groove along each division line by ablation, said division lines being formed on a front side of said wafer to define a plurality of separate regions where a plurality of devices are each formed, said laser processing apparatus comprising: a chuck table for holding said wafer; laser beam applying means having focusing means for applying said laser beam to said wafer held on said chuck table; feeding means for relatively feeding said chuck table and said laser beam applying means in an X direction; indexing means for relatively indexing said chuck table and said laser beam applying means in a Y direction perpendicular to said X direction; an imaging unit for imaging a work area; and a controller; said controller including a target pattern detecting section performing matching between a key pattern stored in said target pattern detecting section and patterns contained in an image obtained by said imaging unit to thereby detect a target pattern included in each device, a spacing detecting section detecting the spacing in said Y direction between said target pattern and said ablation groove, and a map creating section operating said feeding means to thereby move said wafer held on said chuck table in said X direction with respect to said imaging unit, obtaining the result of detection by said target pattern detecting section for said devices arranged along said ablation groove, and finally creating a map showing the spacing in said Y direction between each target pattern and said ablation groove.

Preferably, the controller further includes a pass/fail determining section determining whether or not the difference between a maximum value and a minimum value for the spacing in the Y direction between each target pattern and the ablation groove falls within a tolerance, according to the map created by the map creating section, wherein when the difference between the maximum value and the minimum value falls within the tolerance, accuracy pass is judged for the feeding means, whereas when the difference between the maximum value and the minimum value falls out of the tolerance, accuracy fail is judged for the feeding means.

Preferably, the controller further includes a position correcting section operating the indexing means according to the map created by the map creating section, thereby correcting the position of the laser beam in the Y direction.

According to the present invention, the controller included in the laser processing apparatus includes the target pattern detecting section performing matching between patterns contained in an image obtained by the imaging unit and a key pattern stored in the target pattern detecting section to thereby detect a target pattern included in each device, the spacing detecting section detecting the spacing in the Y direction between the target pattern and the ablation groove, and the map creating section operating the feeding means to thereby move the wafer held on the chuck table in the X direction with respect to the imaging unit, obtaining the result of detection by the target pattern detecting section for the devices arranged along the ablation groove, obtaining the result of detection by the spacing detecting section for the devices arranged along the ablation groove, and finally creating the map showing the spacing in the Y direction between each target pattern and the ablation groove. Accordingly, even when yawing in the Y direction occurs in the feeding means, the laser processing apparatus of the present invention can check whether or not the yawing of the feeding means falls within tolerance according to the map created.

According to the present invention, the controller may further include the pass/fail determining section determining whether or not the difference between a maximum value and a minimum value for the spacing in the Y direction between each target pattern and the ablation groove falls within a tolerance, according to the map created by the map creating section, wherein when the difference between the maximum value and the minimum value falls within the tolerance, accuracy pass is judged for the feeding means, whereas when the difference between the maximum value and the minimum value falls out of the tolerance, accuracy fail is judged for the feeding means. Accordingly, even when yawing in the Y direction occurs in the feeding means and this yawing falls out of tolerance, accuracy fail can be judged for the feeding means. In this case, an operator can repair or replace the feeding means to make the yawing of the feeding means fall within tolerance. Accordingly, it is possible to prevent the problem that the laser beam applied from the laser beam applying means of the laser processing apparatus may deviate from each division line to cause damage to the devices.

According to the present invention, the controller may further include the position correcting section operating the indexing means according to the map created by the map creating section, thereby correcting the position of the laser beam in the Y direction. Accordingly, the indexing means is operated so that the yawing of the feeding means can be canceled. As a result, the position of the laser beam in the Y direction can be corrected. That is, the yawing of the feeding means can be made to fall within tolerance without repairing or replacing the feeding means, thereby preventing the problem that the laser beam applied from the laser beam applying means of the laser processing apparatus may deviate from each division line to cause damage to the devices.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
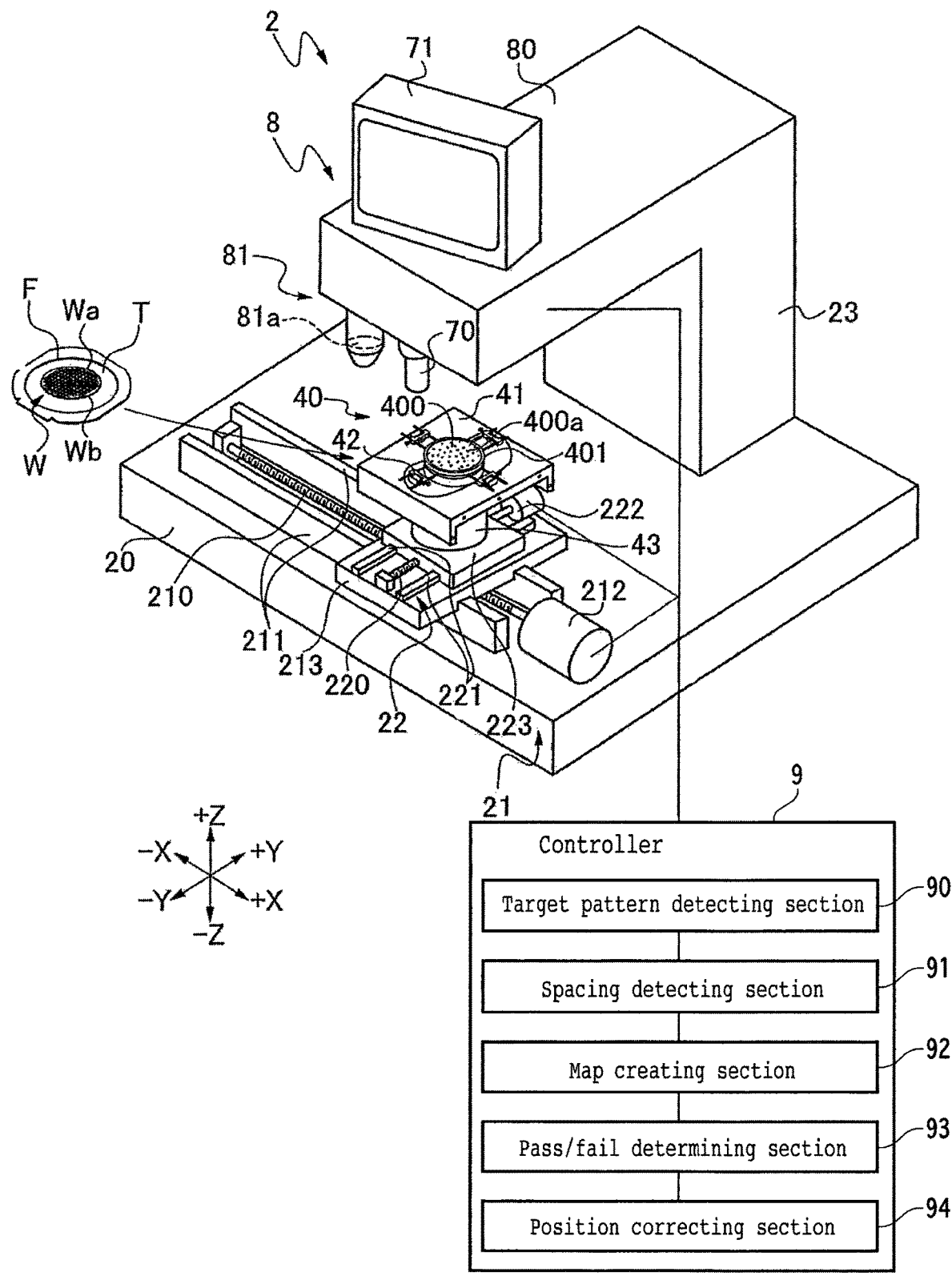
FIG. 1 is a perspective view of a laser processing apparatus according to a preferred embodiment of the present invention.

A laser processing apparatus 2 according to a preferred embodiment of the present invention is shown in FIG. 1. The laser processing apparatus 2 includes a chuck table 40 for holding a wafer W and laser beam applying means 8 for applying a laser beam to the wafer W held on the chuck table 40, wherein the wafer W is supported through an adhesive tape T to a ring frame F.

The laser processing apparatus 2 includes a base 20. Feeding means 21 for feeding the chuck table 40 in the X direction with respect to the laser beam applying means 8 is provided on the base 20 at its front portion (on the −Y side). The feeding means 21 is composed of a ball screw 210 having an axis extending in the X direction, a pair of guide rails 211 extending parallel to the ball screw 210, a pulse motor 212 for rotating the ball screw 210, and a movable plate 213 having an internal nut engaged with the ball screw 210 and a bottom portion slidably supported to the guide rails 211. When the ball screw 210 is rotated by the pulse motor 212, the movable plate 213 is moved in the X direction as being guided by the guide rails 211, so that the chuck table 40 supported to the movable plate 213 is moved in the X direction by the movement of the movable plate 213. Accordingly, the wafer W held on the chuck table 40 is fed in the X direction. The pulse motor 212 is connected to a controller 9. For example, the pulse motor 212 is operated by a pulse signal supplied from a pulse oscillator (not shown) included in the controller 9. The controller 9 counts the number of pulses constituting the pulse signal supplied to the pulse motor 212, thereby recognizing the feed amount of the chuck table 40 and controlling the X position of the chuck table 40 (the position of the chuck table 40 in the X direction).

The chuck table 40 includes a suction holding portion 400 for holding the wafer W under suction and a frame member 401 for supporting the suction holding portion 400. The suction holding portion 400 is in communication with a vacuum source (not shown). The suction holding portion 400 has a holding surface 400a as an exposed surface on which the wafer W is to be held under suction. The chuck table 40 is surrounded by a cover 41. Rotating means 43 for rotating the chuck table 40 is provided below the chuck table 40. Further, clamping means 42 for clamping the ring frame F is provided around the chuck table 40.

The chuck table 40 is movable in the X direction (opposite directions shown by arrows −X and +X) by the feeding means 21. The chuck table 40 is also movable in the Y direction perpendicular to the X direction by indexing means 22 provided below the chuck table 40. The indexing means 22 is composed of a ball screw 220 having an axis extending in the Y direction, a pair of guide rails 221 extending parallel to the ball screw 220, a pulse motor 222 for rotating the ball screw 220, and a movable plate 223 having an internal nut engaged with the ball screw 220 and a bottom portion slidably supported to the guide rails 221. When the ball screw 220 is rotated by the pulse motor 222, the movable plate 223 is moved in the Y direction as being guided by the guide rails 221, so that the chuck tale 40 supported to the movable plate 223 is moved in the Y direction by the movement of the movable plate 223. Accordingly, the wafer W held on the chuck table 40 is indexed in the Y direction. The pulse motor 222 is connected to the controller 9. For example, the pulse motor 222 is operated by a pulse signal supplied from a pulse oscillator (not shown) included in the controller 9. The controller 9 counts the number of pulses constituting the pulse signal supplied to the pulse motor 222, thereby recognizing the index amount of the chuck table 40 and controlling the Y position of the chuck table 40 (the position of the chuck table 40 in the Y direction).

A wall portion 23 is provided on the base 20 at its rear portion (on the +Y side) so as to project upward. The laser beam applying means 8 for applying a laser beam to the wafer W is provided on one side (−Y side) of the wall portion 23.

The laser beam applying means 8 includes a housing 80 projecting from the wall portion 23 in the −Y direction shown by an arrow −Y, a laser oscillator (not shown) provided in the housing 80 for oscillating a laser beam, and focusing means 81 mounted on the lower surface of the housing 80 at its front end portion for focusing the laser beam oscillated from the laser oscillator. The focusing means 81 includes a mirror (not shown) for reflecting the laser beam oscillated from the laser oscillator and a focusing lens 81a for focusing the laser beam reflected from the mirror to the front side of the wafer W, thereby performing ablation to the wafer W. As shown in FIG. 1, an imaging unit 70 for imaging a work area of the wafer W to be processed is provided above a moving path of the chuck table 40 in the vicinity of the focusing means 81. The imaging unit 70 includes a microscope and a camera using a CCD image sensor, for example. An image obtained by the imaging unit 70 is displayed by display means 71 such as a monitor provided on the upper surface of the housing 80. Accordingly, an operator can recognize the image of the work area of the wafer W through the display means 71.

Figure 2:
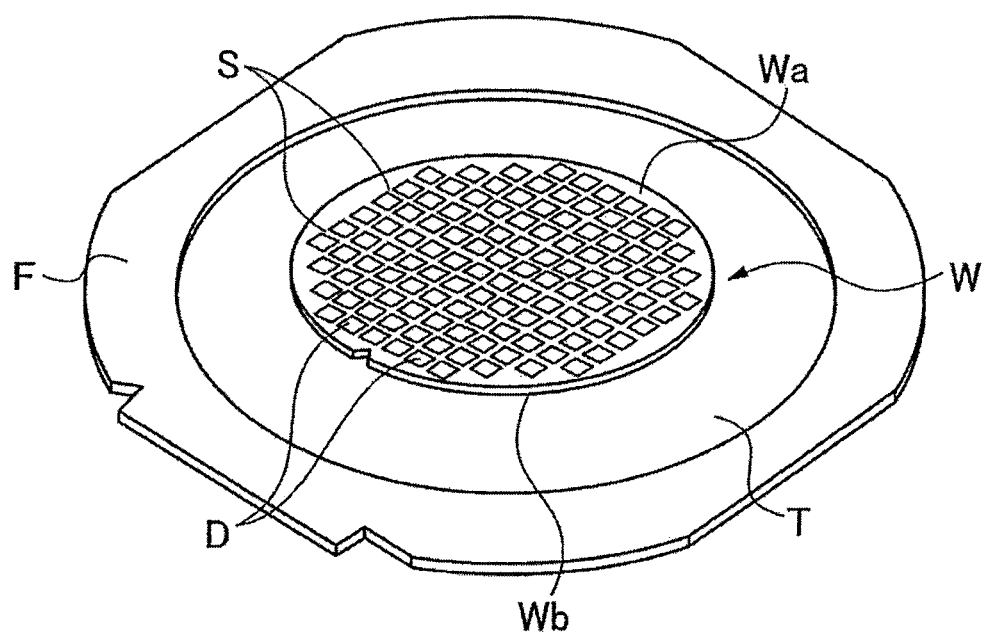
FIG. 2 is a perspective view of a wafer supported through an adhesive tape to a ring frame.

Referring to FIG. 2, the wafer W supported through the adhesive tape T to the ring frame F is shown in perspective. The wafer W has a front side Wa and a back side Wb. For example, the wafer W is a circular semiconductor wafer. A plurality of crossing division lines S are formed on the front side Wa of the wafer W to thereby define a plurality of rectangular separate regions where a plurality of devices D are formed. For example, each division line S has a width of about 50 μm. The wafer W supported through the adhesive tape T to the ring frame F is held on the chuck table 40 of the laser processing apparatus 2 shown in FIG. 1. The shape and kind of the wafer W are not limited to those described in this preferred embodiment.

Each device D formed on the front side Wa of the wafer W has the same circuit patterns. Of these circuit patterns formed on the front side of each device D, one pattern having a characteristic shape is preliminarily selected as a key pattern P shown in FIG. 3, for example. An image 70a containing this key pattern P is stored in the controller 9. The key pattern P is included in each device D formed on the front side Wa of the wafer W and is formed at a similar position. While the key pattern P shown in FIG. 3 has an L-shape, the shape of the key pattern P is not limited in the present invention.

The controller 9 is composed of at least a CPU and a storage element such as a memory. As shown in FIG. 1, the controller 9 includes a target pattern detecting section 90, a spacing detecting section 91, a map creating section 92, a pass/fail determining section 93, and a position correcting section 94. The target pattern detecting section 90 functions to perform matching between the patterns contained in the image obtained by the imaging unit 70 and the key pattern P shown in FIG. 3 to thereby detect a target pattern having the same shape as that of the key pattern P. The spacing detecting section 91 functions to detect the spacing in the Y direction between the target pattern and an ablation groove formed on a predetermined one of the division lines S. The map creating section 92 functions to operate the feeding means 21, thereby moving the wafer W held on the chuck table 40 in the X direction with respect to the imaging unit 70, to obtain the result of detection by the target pattern detecting section 90 for the plural devices D arranged along the ablation groove, to obtain the result of detection by the spacing detecting section 91 for the plural devices D arranged along the ablation groove, and finally to create a map showing the spacing in the Y direction between each target pattern and the ablation groove. The pass/fail determining section 93 functions to determine whether or not the difference between a maximum value and a minimum value for the spacing in the Y direction between each target pattern and the ablation groove falls within a tolerance, according to the map created by the map creating section 92, wherein when the difference between the maximum value and the minimum value falls within the tolerance, accuracy pass is judged for the feeding means 21, whereas when the difference between the maximum value and the minimum value falls out of the tolerance, accuracy fail is judged for the feeding means 21. The position correcting section 94 functions to operate the indexing means 22 according to the map created by the map creating section 92, thereby correcting the position (Y position) of the laser beam in the Y direction.

Figure 3:
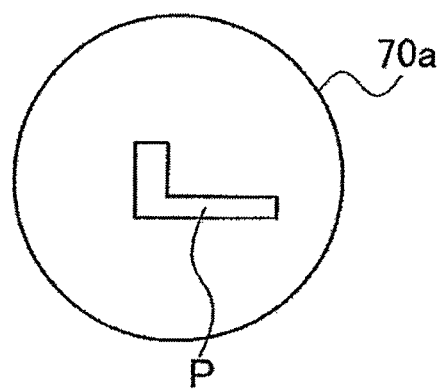
FIG. 3 is a plan view showing an image containing a key pattern.

The target pattern detecting section 90 preliminarily stores the image 70a shown in FIG. 3. Further, the target pattern detecting section 90 also preliminarily stores the positional relation between a target pattern P1 formed in a device D1 shown in FIG. 4 and the predetermined division line S extending in the X direction, i.e., a fixed reference spacing Lo between the target pattern P1 and the center line So of the predetermined division line S.

There will now be described the operation of the laser processing apparatus 2 in the case of applying the laser beam from the laser beam applying means 8 to the wafer W to perform ablation on the predetermined division line, thereby forming the ablation groove along the predetermined division line.

(1) Laser Beam Applying Step

Figure 5:
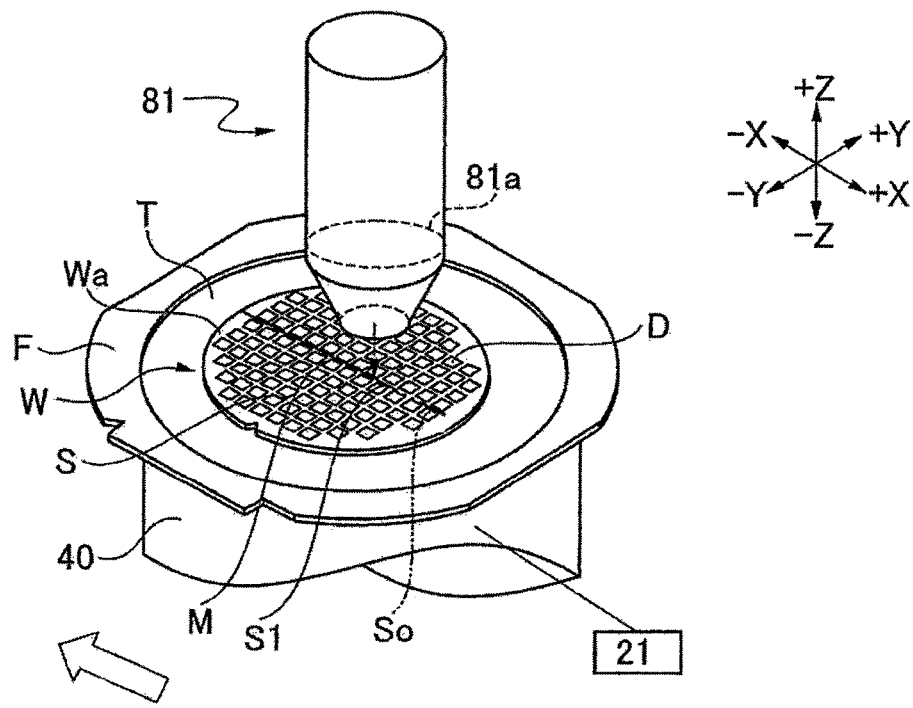
FIG. 5 is a perspective view showing a condition that a laser beam is applied to the wafer to form an ablation groove along a predetermined division line.

In operating the map creating section 92 included in the laser processing apparatus 2 to create the map mentioned above, it is necessary to form at least one ablation groove by performing ablation. In this preferred embodiment, a laser beam is applied to the wafer W in the laser processing apparatus 2 to perform ablation on a predetermined one of the division lines S, thereby forming one ablation groove. For example, this predetermined division line S as a target of ablation is selected as a division line S1 extending in the X direction as shown in FIG. 5. That is, the division line S1 is one of the plural longest division lines S adjacent to the most devices D. As a modification, a wafer for testing may be used in place of the wafer W.

First, the wafer W supported through the adhesive tape T to the ring frame F is placed on the chuck table 40 in the condition where the adhesive tape T attached to the back side Wb of the wafer W is opposed to the holding surface 400a of the chuck table 40 included in the laser processing apparatus 2 shown in FIG. 1. Thereafter, the ring frame F is clamped by the clamping means 42 provided around the chuck table 40. Further, the vacuum source (not shown) connected to the chuck table 40 is operated to hold the wafer W on the chuck table 40 under suction.

Thereafter, the feeding means 21 is operated to feed the wafer W held on the chuck table 40 in the −X direction shown by an arrow −X, thereby positioning the wafer W directly below the imaging unit 70. In this position, the work area of the wafer W to be processed is imaged by the imaging unit 70. The image obtained by the imaging unit 70 is transmitted as a digital signal to the target pattern detecting section 90 of the controller 9 connected to the imaging unit 70.

Figure 4:
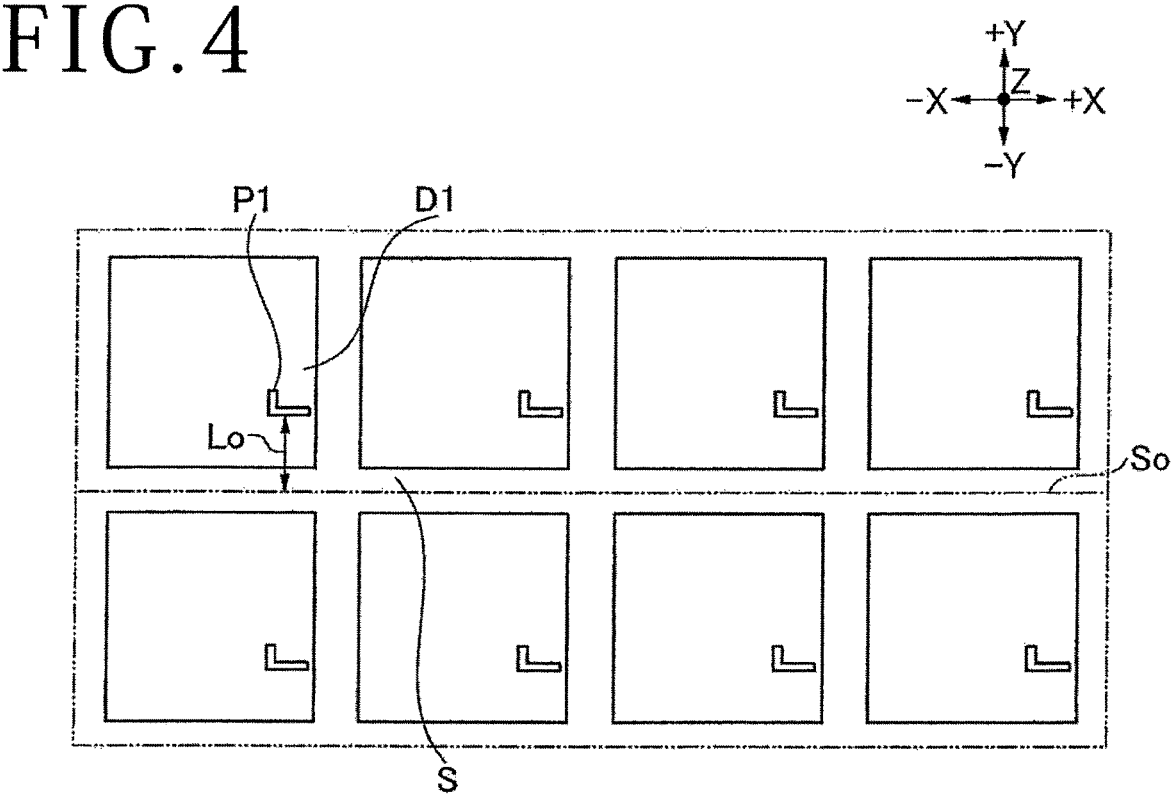
FIG. 4 is an enlarged plan view showing a part of the front side of the wafer.

The target pattern detecting section 90 refers to the image transmitted from the imaging unit 70 and the image 70a preliminarily stored and then performs matching between the patterns formed on the front side of each device D and the key pattern P contained in the image 70a shown in FIG. 3, thereby detecting the target pattern P1 shown in FIG. 4. Accordingly, the target pattern detecting section 90 detects the position (Y position) of the predetermined division line S1 extending in the X direction by referring to the information preliminarily stored in the target pattern detecting section 90, i.e., the fixed reference spacing Lo between the center line So of the predetermined division line S1 and the target pattern P1 as shown in FIG. 4. In association with the detection of the division line S1 extending in the X direction, a predetermined number of pulses are supplied from the pulse oscillator included in the controller 9 shown in FIG. 1 to the pulse motor 222 of the indexing means 22, thereby moving the chuck table 40 in the Y direction by a predetermined amount. In this manner, alignment in the Y direction is performed between the division line S1 and the focusing means 81 of the laser beam applying means 8. For example, this alignment is performed so that the center line So of the division line S1 is positioned directly below the focusing lens 81a of the focusing means 81.

After performing the alignment in the Y direction between the division line S1 and the focusing means 81, the focal point of the laser beam to be applied from the focusing means 81 is positioned on the center line So of the division line S1. Thereafter, the laser beam is applied to the wafer W along the center line So of the division line S1 by moving the wafer W in the −X direction at a feed speed of 100 mm/second, for example, thereby performing ablation on the division line S1. That is, an ablation groove M is formed on the division line S1 as shown in FIG. 5. When the wafer W is moved in the −X direction to reach a predetermined position where the laser beam has been applied over the entire length of the division line S1, the movement of the wafer W in the −X direction is once stopped and the chuck table 40 is next moved back to an original position in the +X direction shown by an arrow +X.

Figure 6:
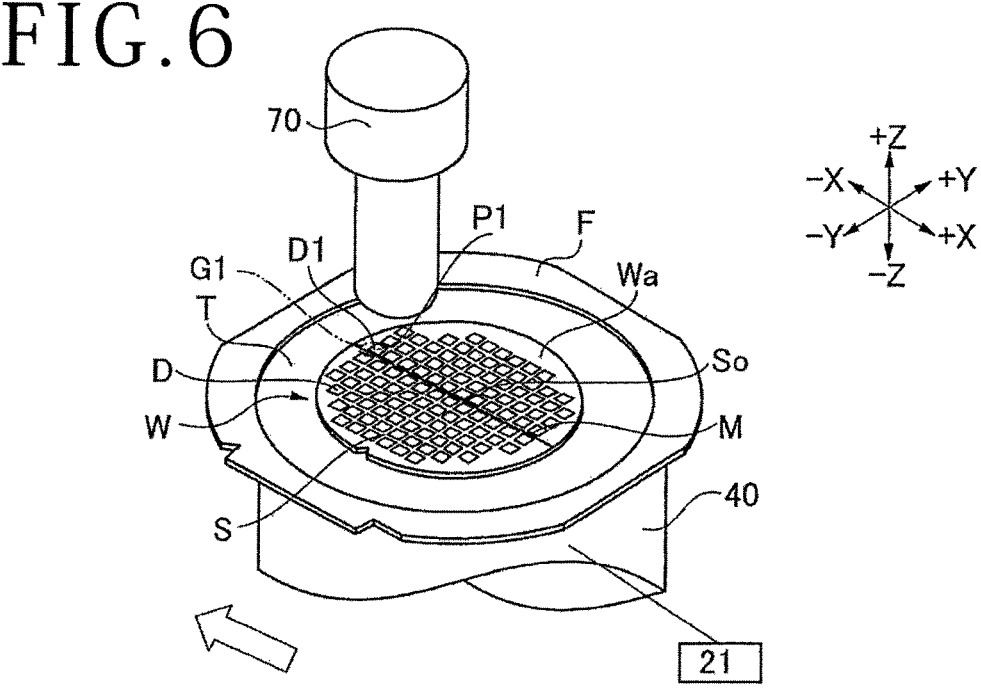
FIG. 6 is a perspective view showing a condition that an imaging unit images an area including the ablation groove and a target pattern formed in each device.
Figure 7:
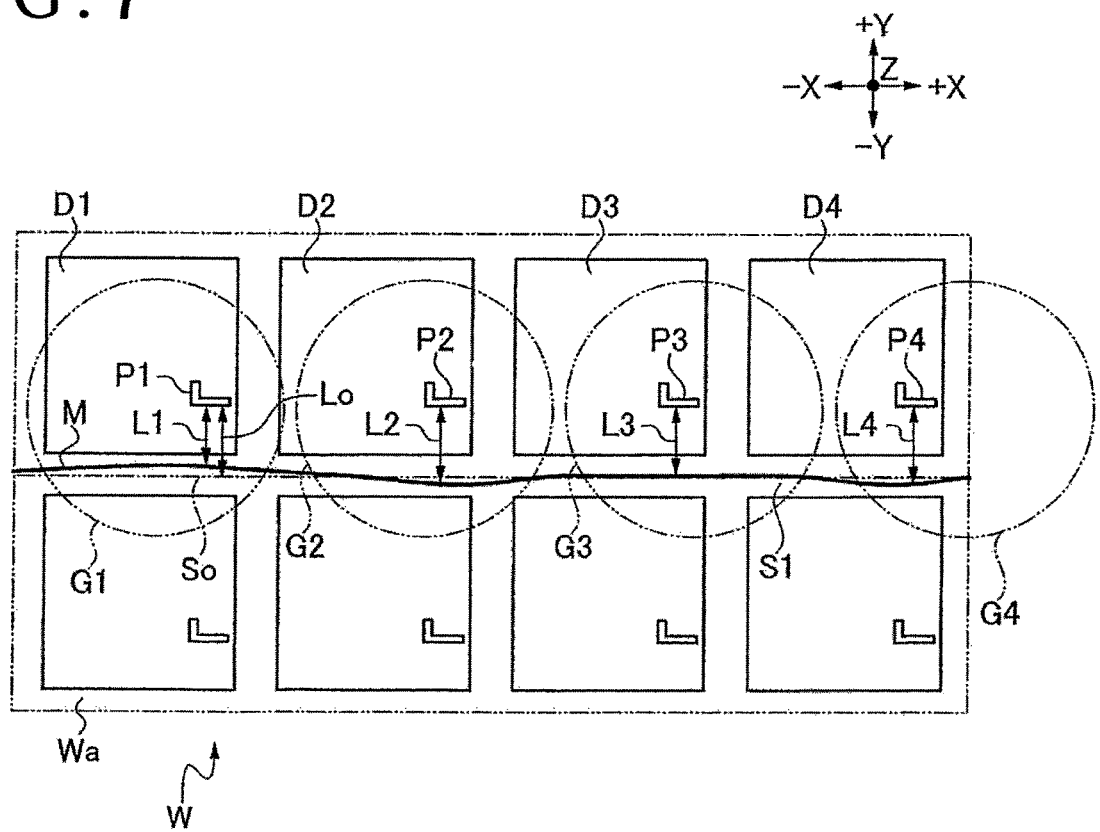
FIG. 7 is an enlarged plan view showing a part of the front side of the wafer after forming the ablation groove.

For example, the laser beam is applied under the following processing conditions.
Light source: YAG laser or YVO4 laser
Wavelength: 355 nm (ultraviolet light)
Repetition frequency: 50 kHz
Average power: 3 W
Work feed speed: 100 mm/second (2) Target Pattern Detecting Step After performing ablation on the division line S1 extending in the X direction to form the ablation groove M extending over the entire length of the division line S1, the wafer W held on the chuck table 40 is moved again in the −X direction to image a subject area G1 as shown in FIG. 6. That is, the imaging unit 70 is operated to image the subject area G1 containing the ablation groove M and the target pattern P1 formed in the device D1 as shown in FIG. 6. Due to the occurrence of yawing of the feeding means 21 in the Y direction, the ablation groove M does not become a straight line parallel to the center line So of the division line S1 as shown in FIG. 7. That is, the ablation groove M becomes a meandering line having a portion displaced from the center line So in the Y direction.

In this manner, the subject area G1 containing both the target pattern P1 formed in the device D1 and the ablation groove M formed on the division line S1 is imaged by the imaging unit 70. The image obtained by the imaging unit 70 is transmitted to the target pattern detecting section 90. Thereafter, the target pattern detecting section 90 performs pattern matching for determining whether or not the target pattern P1 contained in the image obtained by the imaging unit 70 coincides with the key pattern P preliminarily stored in the target pattern detecting section 90. At the time the pattern matching is finished, the operation of the imaging unit 70 and the chuck table 40 is stopped.

(3) Spacing Detecting Step

Thereafter, the image of the subject area G1 containing both the target pattern P1 and the ablation groove M is also transmitted to the spacing detecting section 91. The spacing detecting section 91 recognizes the target pattern P1 and the ablation groove M in the image according to different pixels having inherent color information. Further, the spacing detecting section 91 calculates a spacing L1 between the target pattern P1 and the ablation groove M in the Y direction as shown in FIG. 7, according to the number of pixels present therebetween. For example, the spacing L1 is 203 µm.

(4) Map Creating Step

Figure 8:
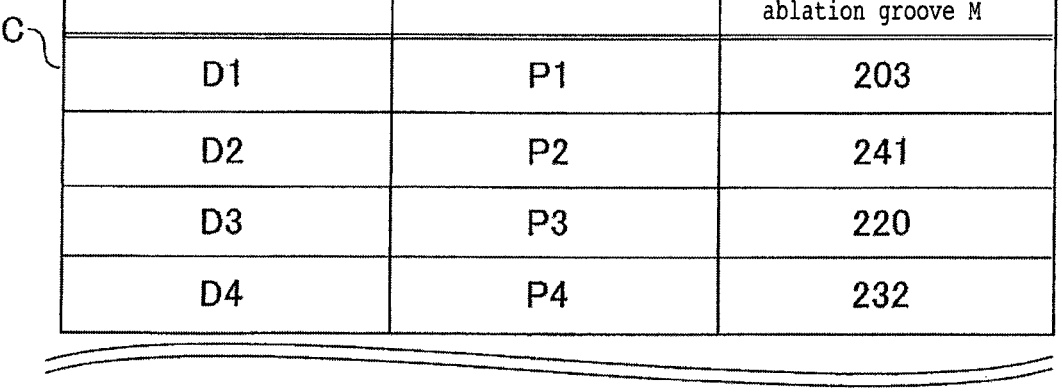
FIG. 8 is a map showing the spacing between each target pattern and the ablation groove as created by a map creating section.

After the spacing detecting section 91 detects the spacing L1 between the target pattern P1 and the ablation groove M in the Y direction as mentioned above, the map creating section 92 records the value of "203 µm" for the spacing L1 between the target pattern p1 and the ablation groove M into a map C shown in FIG. 8, wherein the target pattern P1 and the spacing L1 are associated with the device D1.

Thereafter, the target pattern detecting step and the spacing detecting step are performed again. More specifically, the feeding means 21 is operated to feed the chuck table 40, and the imaging unit 70 is operated to image a subject area G2 as shown in FIG. 7, wherein the subject area G2 contains both the ablation groove M and a target pattern P2 formed in a device D2 adjacent to the device D1 in the X direction. Thus, the target pattern P2 is detected by the target pattern detecting section 90. Further, a spacing L2 between the target pattern P2 and the ablation groove M in the Y direction is detected by the spacing detecting section 91. For example, the spacing L2 is 241 µm. In the map creating step, the map creating section 92 records the value of "241 µm" for the spacing L2 between the target pattern P2 and the ablation groove M into the map C, wherein the target pattern P2 and the spacing L2 are associated with the device D2.

Such an operation is repeated for all of the other devices arranged in a line along the division line S1 in the X direction to create the map C shown in FIG. 8. More specifically, the above operation is repeated for all of the other devices D3, D4, . . . D(m−1), and Dm. That is, m devices D1 to Dm (m is an integer greater than 1) are arranged in a line along the division line S1 in the X direction. In this case, other target patterns P3, P4, . . . P(m−1), and Pm respectively formed in the other devices D3, D4, . . . D(m−1), and Dm are detected by the target pattern detecting section 90, and other spacings L3, L4, . . . L(m−1), and Lm respectively corresponding to the target patterns P3, P4, . . . P(m−1), and Pm are detected by the spacing detecting section 91. Then, the map creating section 92 creates the map C shown in FIG. 8 according to the results of detection by the target pattern detecting section 90 and the spacing detecting section 91.

The map C to be created by the map creating section 92 is not limited to that described above. For example, after detecting the spacing L1 between the target pattern P1 and the ablation groove M, the spacing detecting section 91 may detect the spacing L3 and the map creating section 92 may record the value for the spacing L3 detected above into the map C. As another modification, after detecting the spacing between each target pattern and the ablation groove M a predetermined number of times (e.g., for all of the devices arranged in a line in the X direction), the map creating section 92 may temporarily store the plural values for the spacing detected above and next collectively record the data temporarily stored above into the map C.

(5) Pass/Fail Determining Step

The pass/fail determining section 93 calculates the difference between a maximum value and a minimum value for the spacing in the Y direction between each target pattern in each corresponding device D and the ablation groove M, according to the map C created by the map creating section 92. Further, the pass/fail determining section 93 preliminarily stores a tolerance for the difference between a maximum value and a minimum value for the spacing in the Y direction between each target pattern in each corresponding device D and the ablation groove M. Then, the pass/fail determining section 93 determines whether or not the difference between a maximum value and a minimum value for the spacing in the Y direction between each target pattern and the ablation groove M is less than or equal to the tolerance, i.e., falls within the tolerance. When the difference between the maximum value and the minimum value falls within the tolerance, accuracy pass is judged for the feeding means 21, whereas when the difference between the maximum value and the minimum value falls out of the tolerance, accuracy fail is judged for the feeding means 21. For example, the pass/fail determining section 93 preliminarily stores a value of 10 μm for the tolerance. First, according to the map C, the pass/fail determining section 93 selects the spacing L2 (241 μm) in the Y direction between the target pattern P2 and the ablation groove M as the maximum value and further selects the spacing L1 (203 μm) in the Y direction between the target pattern P1 and the ablation groove M as the minimum value. Then, the pass/fail determining section 93 calculates the difference (38 μm) between the maximum value and the minimum value.

Since the difference (38 μm) between the maximum value and the minimum value for the spacing in the Y direction between each target pattern and the ablation groove M falls out of the tolerance (10 μm) in this case, the pass/fail determining section 93 determines accuracy fail for the feeding means 21 and then displays this result on the display means 71 (shown in FIG. 1) to inform the operator of this result. Then, the operator informed of this result can repair or replace the feeding means 21 to make the yawing of the feeding means 21 fall within tolerance.

As described above, even when yawing in the Y direction occurs in the feeding means 21, the laser processing apparatus 2 according to the present invention can check whether or not the yawing of the feeding means 21 falls within tolerance, by detecting each target pattern through the target pattern detecting section 90, next detecting the spacing in the Y direction between each target pattern detected above and the ablation groove M through the spacing detecting section 91, and next creating the map C through the map creating section 92.

Further, the controller 9 also includes the pass/fail determining section 93, so that according to the map C created by the map creating section 92, the operator can easily determine that the yawing of the feeding means 21 falls out of tolerance as in this preferred embodiment. In this case, the operator can repair or replace the feeding means 21 to make the yawing of the feeding means 21 fall within tolerance. Accordingly, it is possible to prevent the problem that the laser beam applied from the laser beam applying means 8 of the laser processing apparatus 2 may deviate from each division line S to cause damage to the devices D.

Alternatively, even when yawing occurs in the feeding means 21, the feeding means 21 may not be repaired or replaced regardless of whether or not the yawing falls within tolerance, but the operation of the indexing means 22 may be adjusted by the position correcting section 94 to thereby correct the Y position of the laser beam to be applied to each division line S.

For example, the position correcting section 94 calculates a correction value for the yawing of the feeding means 21 in the Y direction according to the map C created by the map creating section 92. More specifically, the correction value is defined as a difference between each spacing (L1 to Lm) between each target pattern and the ablation groove M in the Y direction and the fixed reference spacing Lo (e.g., 210 μm) between the center line So of the division line S1 and the target pattern P1. The position correcting section 94 preliminarily stores the correction value calculated above for each spacing in a memory or the like. Then, the position correcting section 94 increases or decreases the number of pulses to be supplied from the controller 9 to the pulse motor 222 of the indexing means 22, thereby correcting the Y position of the laser beam applying means 8 by an amount corresponding to the correction value. At the same time, the chuck table 40 and the indexing means 22 are fed in the X direction by the feeding means 21. As a result, a straight ablation groove extending along the center line So of the division line S1 can be formed.

In this manner, in the case that the controller 9 also includes the position correcting section 94 as in this preferred embodiment, the yawing of the feeding means 21 can be made to fall within tolerance without repairing or replacing the feeding means 21, thereby preventing the problem that the laser beam applied from the laser beam applying means 8 may deviate from each division line S to cause damage to the devices D.

While the feeding means 21 in this preferred embodiment is configured to move the chuck table 40 in the X direction, the feeding means in the present invention may be configured to move the laser beam applying means 8 in the X direction. In other words, the feeding means in the present invention is defined as means for relatively feeding the chuck table 40 and the laser beam applying means 8 in the X direction.

Further, while the indexing means 22 in this preferred embodiment is configured to move the chuck table 40 in the Y direction, the indexing means in the present invention may be configured to move the laser beam applying means 8 in the Y direction. In other words, the indexing means in the present invention is defined as means for relatively indexing the chuck table 40 and the laser beam applying means 8 in the Y direction.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus for applying a laser beam to a wafer along a plurality of crossing division lines to form an ablation groove along each division line by ablation, said division lines being formed on a front side of said wafer to define a plurality of separate regions where a plurality of devices are each formed, each of said devices having a device pattern, said laser processing apparatus comprising:

a chuck table for holding said wafer;

laser beam applying means having focusing means for applying said laser beam to said wafer held on said chuck table;

feeding means for relatively feeding said chuck table and said laser beam applying means in an X direction;

indexing means for relatively indexing said chuck table and said laser beam applying means in a Y direction perpendicular to said X direction;

a camera for imaging a work area; and a controller having a CPU and a memory, the CPU being programmed to:

store a key pattern for each device, the key pattern being common to each of said devices;

detect a target pattern, via a target pattern detecting section of the controller, by matching the key pattern in each device with image patterns contained in an image formed by the camera;

detect the spacing in said Y direction between said target pattern and said ablation grooves by measuring the number of pixels between said target pattern and a selected ablation groove;

operate said feeding means to thereby move said wafer held on said chuck table in said X direction with respect to said camera; obtaining the result of detection by said target pattern detecting section for said devices arranged along said ablation groove;

create a map showing the spacing in said Y direction between each target pattern and said selected ablation groove, wherein said map includes a plurality of spacings in said Y direction, with each of said spacings being based on the distance between a different one of said target patterns and the same one of said ablation grooves; and operate said indexing means according to said map, thereby correcting the position of said laser beam applying means, when used for an ablation groove subsequent to the selected ablation groove, in said Y direction as needed.

2. The laser processing apparatus according to claim 1, wherein said controller is further programmed to determine whether or not the difference between a maximum value and a minimum value for the spacing in said Y direction between each target pattern and said ablation groove falls within a tolerance, according to said map, wherein when the difference between said maximum value and said minimum value falls within the tolerance, accuracy pass is judged for said feeding means, whereas when the difference between said maximum value and said minimum value falls out of the tolerance, accuracy fail is judged for said feeding means.

3. A laser processing apparatus for applying a laser beam to a wafer along a plurality of crossing division lines to form an ablation groove along each division line by ablation, said division lines being formed on a front side of said wafer to define a plurality of separate regions where a plurality of devices are each formed, each of said devices having a device pattern, said laser processing apparatus comprising:

a chuck table for holding said wafer;

laser beam applying means having focusing means for applying said laser beam to said wafer held on said chuck table;

feeding means for relatively feeding said chuck table and said laser beam applying means in an X direction;

indexing means for relatively indexing said chuck table and said laser beam applying means in a Y direction perpendicular to said X direction;

a camera for imaging a work area; and a controller having a CPU and a memory, the CPU being programmed to:

store a key pattern for each device, the key pattern being common to each of said devices;

detect a target pattern, via a target pattern detecting section of the controller, by matching the key pattern in each device with image patterns contained in an image formed by the camera;

detect the spacing in said Y direction between said target pattern and said ablation grooves by measuring the number of pixels between said target pattern and a selected ablation groove;

operate said feeding means to thereby move said wafer held on said chuck table in said X direction with respect to said camera;

obtaining the result of detection by said target pattern detecting section for said devices arranged along said ablation groove; and create a map showing the spacing in said Y direction between each target pattern and said selected ablation groove;

wherein said controller is further programmed to determine whether or not the difference between a maximum value and a minimum value for the spacing in said Y direction between each target pattern and said ablation groove falls within a tolerance, according to said map, wherein when the difference between said maximum value and said minimum value falls within the tolerance, accuracy pass is judged for said feeding means, whereas when the difference between said maximum value and said minimum value falls out of the tolerance, accuracy fail is judged for said feeding means.

4. The laser processing apparatus according to claim 1, wherein said indexing means includes a ball screw and a pulse motor for rotating the ball screw, whereby rotating the ball screw relatively moves said chuck table with respect to said laser beam applying means in the Y direction.

5. The laser processing apparatus according to claim 3, wherein said indexing means includes a ball screw and a pulse motor for rotating the ball screw, whereby rotating the ball screw relatively moves said chuck table with respect to said laser beam applying means in the Y direction.

6. The laser processing apparatus according to claim 3, wherein when accuracy fail is judged, the controller informs an operator of the accuracy fail.

7. The laser processing apparatus according to claim 2, wherein when accuracy fail is judged, the controller informs an operator of the accuracy fail.

8. The laser processing apparatus according to claim 3, wherein said laser map includes a plurality of spacings in said Y direction, with each of said spacings being based on the distance between a different one of said target patterns and the same one of said ablation grooves.

* * * * *